July 7, 1936.   W. C. COLEMAN   2,047,134
COFFEE MAKER
Filed May 18, 1934   2 Sheets-Sheet 1
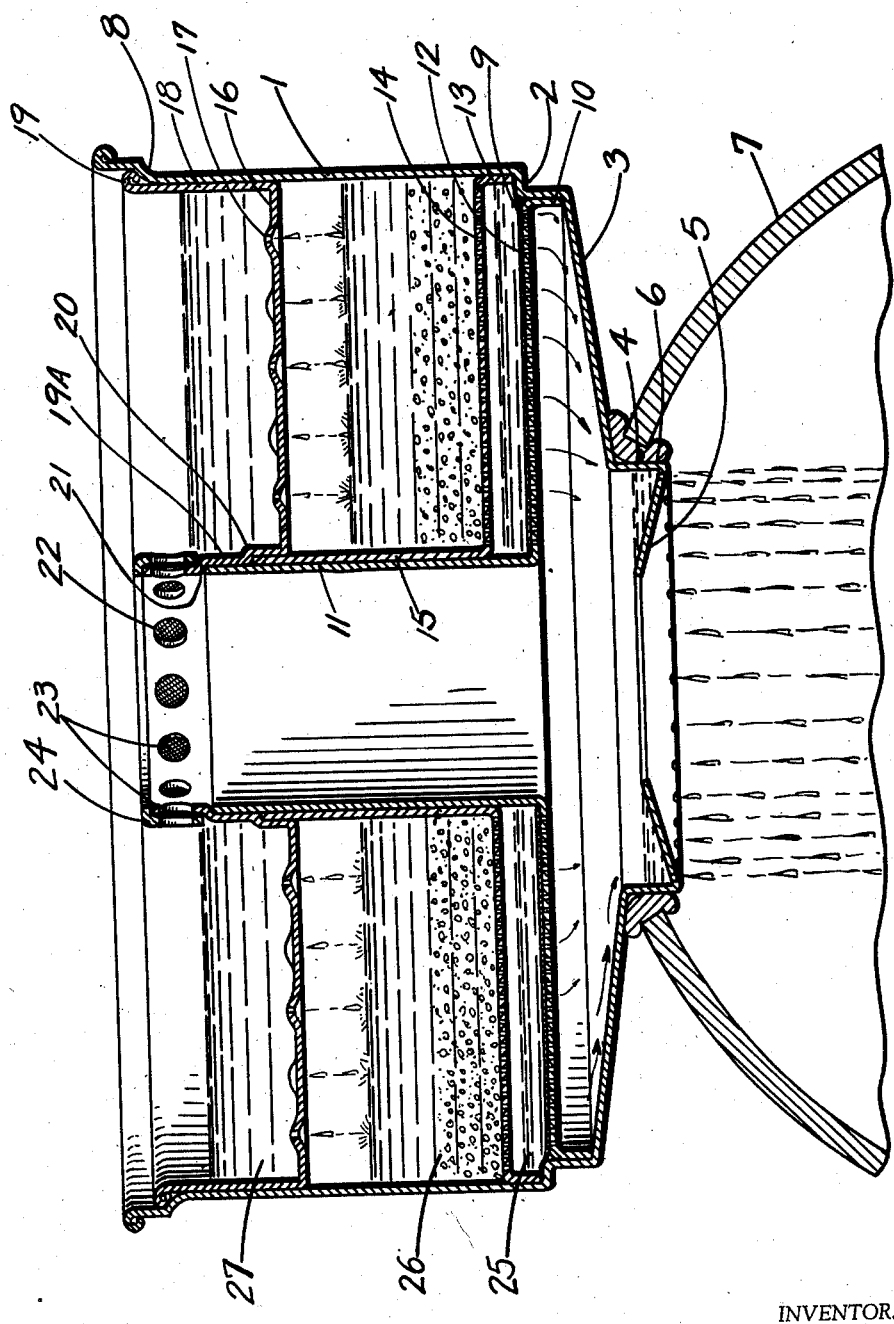
FIGURE I
INVENTOR.
W. C. COLEMAN
BY B. F. Funk
ATTORNEY.

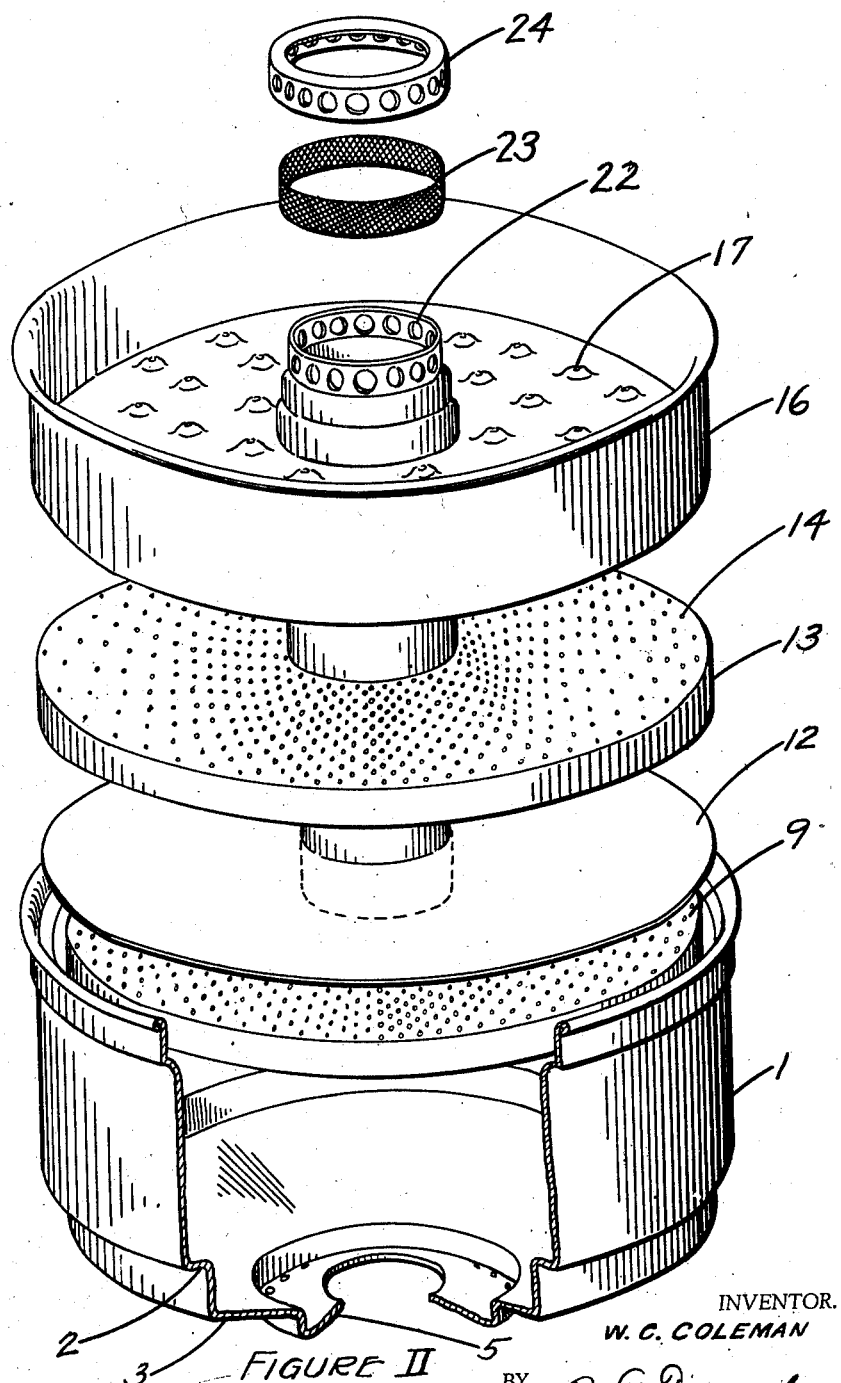

Patented July 7, 1936

2,047,134

UNITED STATES PATENT OFFICE 2,047,134

COFFEE MAKER

William C. Coleman, Wichita, Kans., assignor to The Coleman Lamp and Stove Company, Wichita, Kans., a corporation of Kansas Application May 18, 1934, Serial No. 726,209

6 Claims. (Cl. 53—3)

This invention relates to coffee makers and particularly to a basin to contain ground coffee over which water may be flowed to extract the beverage producing elements of the ground coffee bean. In actual practice I have found that the best results are obtained by contacting the water with the coffee at a temperature below the boiling point and to regulate the time that the water is in contact with the coffee, because if the water is in contact with the coffee for too long a period the bitter alkaline elements and a metallic tasting acid commonly known as "chlorogenic" will be given off by the coffee and thereby render the brew objectionable as a beverage. This is also true if the water contacts with the coffee at too high temperatures. It is also true if the water contact is turbulent or too rapid in flow through the grounds for the required time.

Water boils in various locations in the United States at different temperatures according to altitude, the average being about 211 degrees F. The better coffee is made with water at from 196 to 200 degrees F., provided the water does not contact with the ground coffee for too long a period and the flow is not too rapid, so I have provided means whereby boiling water may be introduced into the basin and contact the coffee by filtration at a temperature drop of from 10 to 15 degrees for a predetermined time.

This is accomplished by providing a cooling surface and controlling the rate of flow in balanced relation so as to produce the necessary temperature drop. The structure also facilitates predetermination of time of contact of supporting the grounds at a plane spaced above the filtering medium. The support for the grounds and the filtering medium are designed to offer a minimum of resistance to the water flow through same. The time of contact of water with grounds being primarily controlled by the time period, during which hot water is delivered to the filtrating unit.

The novelty of the invention will be understood by reference to the following description in connection with the accompanying drawings in which:

Figure 1 is a vertical sectional view through a coffee maker constructed in accordance with my invention, and Figure 2 is a disassociated view of the coffee basin and its appurtenances.

Referring now to the drawings by numerals of reference, 1 designates a coffee basin having a vertical wall provided at its lower end with a shoulder 2 to which an offset bottom 3 is connected, the bottom being inclined toward its axis and having a depending flange 4 with an upwardly and inwardly portion 5. The flange 4 fits into an opening 6 in a coffee receptacle 7 of appropriate construction, the bottom 3 being supported by the receptacle. Near the top of the wall of the basin is a shoulder 8 to support the water distributor as will be hereinafter described.

Resting upon the bottom 3 of the basin is a filter paper support comprising a perforate disc 9 provided with a peripheral depending flange 10 which holds the filter paper in spaced relation with the bottom of the basin. The disc has a central opening surrounded by an upstanding tube 11. The filter paper 12 can rest upon the disc 9. It snugly fits the outside of the tube 11 and its outer edge will be clamped upon the shoulder 2 of the basin by the depending flange 13 of the disc shaped coffee support 14. The disc shaped coffee support is provided with an upstanding tube 15 which surrounds the tube 11. The basin is provided with a water distributor comprising a perforate disc 16 having perforate raised portions 17 over its surface. The disc 16 is provided with a peripheral flange 18, the upper edge of which is in the form of a bead 19 to rest upon the shoulder 8. The disc 16 is also provided with an inner tubular flange 19A, having a shoulder 20 to rest upon the edge of the tube 5 and a shoulder 21 to rest upon the upper edge of the tube 11. The upper end of the flange 19A has a plurality of openings 22 preferably covered by a screen 23 held in place by a ring 24.

The construction heretofore described provides a filter space 25, a coffee space 26 and a water space 27. When the coffee is in the coffee space the operator will cause boiling water to enter into the water space 27, and since the water space has a relatively large diameter and its outflow is definitely restricted, there will be a cooling of the water as it flows into the coffee space to provide a definite temperature drop. The coffee maker illustrated is designed for a two to three gallon container. For such a device, I recommend that the water space 27 be from nine to eleven inches in diameter and that the perforations in projection 17 be of sufficient port areas to permit from two to three quarts of water to flow through per minute. This produces a temperature drop of from 10 to 15 degrees Fahrenheit, depending somewhat upon the number and size of perforations employed so that the water contacts the coffee at a temperature of 196 to 200 degrees Fahrenheit. This temperature range, I have found, will permit the water to take out the lighter oils of the coffee carrying all desirable elements without taking out any appreciable amount of the viscous oils carrying the undesirable elements.

It will therefore be apparent that the essential requirement in making good coffee is to provide a cooling surface for boiling water and control the rate of flow in balanced relation with the cooling surface so as to produce a temperature drop of from approximately 10 to 15 degrees Fahrenheit, having in mind that the initial temperature of the water is at the boiling point. This associated with means for controlling time of contact (water with grounds) and means for filtration of beverage below point of contact, gives ideal conditions producing best results.

The flange 18 of the water distributor and the outer wall of the basin provides sufficient insulation so that there will be but limited radiation of heat through the side walls, the cooling being effected by the size of the water space and the rate of flow through the distributor which can be so balanced as to produce the necessary temperature drop.

If the water level in the water space rises above a predetermined point the water will flow through the screened openings 22 into the container 7. The purpose of providing the openings with screens is that coffee sometimes contains fines which the hot water might cause to foam up through the bottom of the water container to the surface of the water in the container, but by providing the screens, danger of the fines flowing into the receptacle will be eliminated.

Attention is also called to the fact that by providing the filter paper below the bottom of the coffee container, the fines of the coffee will be arrested or filtered out of the brew so that a clear beverage will be delivered to the container 7. This location of the filter paper at some spaced relation below the cake of coffee grounds permits the hot water to quickly filter out of the coffee grounds when the supply from the distributor above is exhausted. This makes possible a more accurate predetermination of the time of contact between water and the ground coffee bean.

In actual practice, I have found that the process of making coffee in accordance with my invention, produces a beverage of adequate strength and aroma without including any appreciable amount of deleterious substances generally conceded to be objectionable in the coffee brew.

What I claim and desire to secure by Letters Patent is:

1. A coffee basin having a vertical inclosing wall with an inturned bottom edge to provide a shoulder, an inwardly declining bottom vertically offset from the shoulder, the bottom having a discharge opening surrounded by a depending flange, a filter medium support having a peripheral flange resting upon the bottom, spacing the filter medium support above the bottom, a centrally located upstanding overflow tube carried by the filter medium support, the upper end of the tube being below the upper edge of the inclosing wall, a perforate ground coffee support having a depending edge flange resting upon the inturned portion of the wall to provide a space above the filter medium support, the ground coffee support having a central opening through which the overflow tube projects, and a water distributer comprising a perforate disc carried by the inclosing wall in spaced relation above the coffee support.

2. A coffee maker including a container having a bottom discharge, a filtering media above the discharge, a perforate ground coffee holder in the container above the filtering media, and a water distributer above the ground coffee holder, the distributer being provided with a foraminated bottom and having less capacity than the total volume of water passed through the ground coffee, the water distributer being adapted to receive a continuous flow of boiling water from above, the depth of the water receivable in the distributer and the volumetric rate of water flow through the foraminations being such that during the continuous flow of water to the distributer there will be a temperature drop of from 10° F. to 15° F. in the water before it reaches the ground coffee.

3. A coffee maker including a container having a bottom discharge, a ground coffee support above the discharge, a water distributer above the ground coffee support within the container and having a foraminated bottom, the water distributer having a capacity less than the total volume of water used and adapted to receive a continuous flow of boiling water and to discharge the same through the foraminations at a predetermined volume rate to effect a temperature drop of from 10° F. to 15° F. before the water reaches the coffee.

4. A coffee basin having a vertical wall with a shoulder adjacent to its upper edge and an inwardly declining bottom with a central opening, the edge of the opening having a depending flange with an inwardly inclined edge, the bottom being inwardly offset with respect to the wall to provide a shoulder, a perforate filter paper support having a depending flange resting upon the shoulder, an upstanding overflow tube carried by the filter paper support concentric with the basin wall, the upper end of which is below the top of the basin wall, a perforate ground coffee support above the filter paper support extending across the space between the wall of the coffee basket and the upstanding tube and a perforate water distributor supported above the ground coffee support engaging the first named shoulder.

5. A coffee basin having a vertical wall with a shoulder adjacent to its upper edge and an inwardly declining bottom with a central opening, the edge of the opening having a depending flange with an inwardly inclined edge, the bottom being inwardly offset with respect to the wall to provide a shoulder, a perforate filter paper support having a depending flange resting upon the shoulder, an upstanding overflow tube carried by the filter paper support concentric with the basin wall, the upper end of which is below the top of the basin wall, a perforate ground coffee support above the filter paper support extending across the wall of the coffee basket and the upstanding tube and a perforate water distributor supported above the ground coffee support engaging the first named shoulder, the coffee support having a depending flange to clamp the filter paper to its support.

6. A coffee basin having a vertical wall with a shoulder adjacent to its upper edge and an inwardly declining bottom with a central opening, the edge of the opening having a depending flange, a perforate filter paper support having a depending flange resting upon the bottom of the basket, an upstanding overflow tube carried by the filter paper support concentric with the basin wall, the upper end of which is below the top of the basin wall, a perforate ground coffee support above the filter paper support extending across the space between the wall of the coffee basket and the upstanding tube and a perforate water distributor supported above the ground coffee support engaging the first named shoulder, the coffee distributor being of cup shape with a vertical wall resting against the wall of the basket so that both walls serve as insulation for the water within the distributor.

WILLIAM C. COLEMAN.